US008687594B2

(12) United States Patent
Medapalli

(10) Patent No.: US 8,687,594 B2
(45) Date of Patent: Apr. 1, 2014

(54) METHOD AND APPARATUS FOR POWER AND HANDOVER MANAGEMENT IN A MULTIPLE WIRELESS TECHNOLOGY COMMUNICATION DEVICE

(75) Inventor: Kameswara Medapalli, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 160 days.

(21) Appl. No.: 13/033,058

(22) Filed: Feb. 23, 2011

(65) Prior Publication Data

US 2011/0141939 A1 Jun. 16, 2011

Related U.S. Application Data

(63) Continuation-in-part of application No. 12/900,847, filed on Oct. 8, 2010.

(60) Provisional application No. 61/278,661, filed on Oct. 9, 2009, provisional application No. 61/281,348, filed on Nov. 16, 2009, provisional application No. 61/308,255, filed on Feb. 25, 2010.

(51) Int. Cl.
*H04W 4/00* (2009.01)

(52) U.S. Cl.
USPC .......................................................... 370/331

(58) Field of Classification Search
USPC ........... 370/310, 311, 328–339; 455/436–444
See application file for complete search history.

(56) References Cited

U.S. PATENT DOCUMENTS 5,893,036 A 4/1999 Trandai et al.
6,853,851 B1 * 2/2005 Rautiola et al. ............ 455/553.1
7,149,521 B2 * 12/2006 Sundar et al. .............. 455/435.1
7,356,013 B2 * 4/2008 Linder et al. .................. 370/338
7,383,046 B2 * 6/2008 Jagadeesan et al. .......... 455/436

(Continued)

FOREIGN PATENT DOCUMENTS

| KR | 10-2006-0007854 A | | 1/2006 |
|---|---|---|---|
| WO | WO 2008/052580 | * | 5/2008 |
| WO | WO 2011/060429 A1 | | 5/2011 |
| WO | WO 2011/106359 A1 | | 9/2011 |

OTHER PUBLICATIONS

International Search Report directed to related International Patent Application No. PCT/US2010/056865, ISA/US, Alexandria, VA, mailed Jan. 18, 2011; 2 pages.

(Continued)

*Primary Examiner* — Frank Duong
(74) *Attorney, Agent, or Firm* — Sterne, Kessler, Goldstein & Fox P.L.L.C.

(57) ABSTRACT

Method and apparatuses for power and handoff management in a multiple wireless technology communication device are disclosed. One method includes a wireless device communicating using a first technology, and detecting availability of a second technology. Logic control of the wireless device receives a power level indicator of communication signals of the first technology, and determining an acceptable power level of communication signals of the second technology based on the power level indicator. The logic control determines a requested power level of communication signals of the second technology based on a request from a base station. The logic control provides a modified link quality representation to the base station if the requested power level is greater than the acceptable power level. The wireless device transmits to the base station with the second technology at the acceptable power level.

24 Claims, 12 Drawing Sheets

(56) References Cited

U.S. PATENT DOCUMENTS

| | | | |
|---|---|---|---|
| 7,536,186 B2 * | 5/2009 | Dorenbosch et al. | 455/440 |
| 7,689,239 B2 | 3/2010 | Reed et al. | |
| 7,916,696 B2 * | 3/2011 | Noh et al. | 370/331 |
| 7,970,434 B2 * | 6/2011 | Juang | 455/552.1 |
| 8,041,360 B2 * | 10/2011 | Ibe et al. | 455/448 |
| 8,331,315 B2 * | 12/2012 | Purkayastha et al. | 370/331 |
| 8,359,062 B2 * | 1/2013 | Tu et al. | 455/552.1 |
| 2004/0095901 A1 | 5/2004 | Rajkotia | |
| 2004/0137902 A1 | 7/2004 | Chaskar et al. | |
| 2005/0053038 A1 | 3/2005 | Kimura | |
| 2005/0170776 A1 | 8/2005 | Siorpaes | |
| 2006/0019679 A1 | 1/2006 | Rappaport et al. | |
| 2006/0121946 A1 | 6/2006 | Walton et al. | |
| 2006/0133322 A1 | 6/2006 | Vannithamby et al. | |
| 2006/0154699 A1 * | 7/2006 | Ko et al. | 455/574 |
| 2007/0147301 A1 | 6/2007 | Noh et al. | |
| 2008/0008141 A1 * | 1/2008 | Tchigevsky et al. | 370/338 |
| 2008/0102874 A1 | 5/2008 | Gautier et al. | |
| 2008/0192666 A1 * | 8/2008 | Koskan et al. | 370/311 |
| 2009/0080349 A1 | 3/2009 | Rofougaran | |
| 2009/0154426 A1 * | 6/2009 | Perraud et al. | 370/332 |
| 2009/0161629 A1 | 6/2009 | Purkayastha et al. | |
| 2009/0323632 A1 | 12/2009 | Nix | |
| 2010/0128696 A1 | 5/2010 | Fantini et al. | |
| 2010/0291884 A1 | 11/2010 | Hu et al. | |
| 2011/0086638 A1 | 4/2011 | Medapalli | |

OTHER PUBLICATIONS

International Search Report directed to related International Patent Application No. PCT/US2011/025833, ISA/US, Alexandria, VA, mailed Apr. 25, 2011; 2 pages.

International Preliminary Report on Patentability and Written Opinion directed to related International Patent Application No. PCT/US2010/056865, ISA/US, Alexandria, VA, mailed May 22, 2012; 8 pages.

International Preliminary Report on Patentability with Written Opinion directed to related International Patent Application No. PCT/US2011/025833, mailed Sep. 7, 2012; 5 pages.

English Language abstract of KR 10-2006-0007854 A, Thomson Innovation, http://www.thomsoninnovation.com, accessed Jan. 29, 2014.

* cited by examiner

METHOD AND APPARATUS FOR POWER AND HANDOVER MANAGEMENT IN A MULTIPLE WIRELESS TECHNOLOGY COMMUNICATION DEVICE

RELATED APPLICATIONS

This application is a continuation-in-part of U.S. patent application Ser. No. 12/900,847 filed Oct. 8, 2010 which claims priority to U.S. provisional patent application Ser. No. 61/278,661 filed on Oct. 10, 2009, and to U.S. provisional patent application Ser. No. 61/281,348 filed on Nov. 16, 2009, and to U.S. provisional patent application Ser. No. 61/308,255 filed on Feb. 25, 2010, which are herein incorporated by reference.

FIELD OF THE DESCRIBED EMBODIMENTS

The described embodiments relate generally to wireless communication. More particularly, the described embodiments relate to methods and apparatuses for power and handoff management in a multiple wireless technology communication device.

BACKGROUND

Wireless communication technologies are rapidly evolving and being deployed. In some situations, it is possible to obtain wireless connections to multiple (for example, 3G, WiMAX, CDMA2000, EVDO-RevA, HSPA, LTE and GSM) wireless networks at a given location. However, at the given location, one of the types of networks may provide a better wireless connection as determined by a better quality of service (QoS) or signal to noise ratio (SNR). Additionally, one type of network may provide better support of a type of data communication.

Generally, a subscriber device of a wireless network user can only communicate with one type of wireless network at a time. Therefore, the user is not able to take advantage of a better connection provided by a wireless network that the subscriber device of the user is not connected to.

A subscriber can simultaneously communicate with multiple networks if the subscriber constantly powers electronic circuitry required to support the multiple networks. However, subscribers are typically in an environment with limited sources of power—for example, USB data cards cannot draw more than 500 mA of current. Even in a battery powered unit, it is undesirable to provide continuous power to circuitry required to simultaneously support multiple networks in order to maximize the battery life. Without powering multiple network support circuitry, if the subscriber unit changes the type of wireless network it is connected to, the communication between the subscriber unit and the wireless network is disrupted. That is, the communication must be halted for a period of time while the subscriber initiates the connection to the new type of wireless network.

It is desirable for a low-power subscriber unit to monitor existence of multiple types of wireless networks and select the most desirable of the wireless network while minimizing power consumed by the low-power subscriber.

SUMMARY

An embodiment includes a method of wireless technology handoff. The method includes a wireless device communicating using a first technology, and detecting availability of a second technology. Logic control of the wireless device receives a power level indicator of communication signals of the first technology, and determines an acceptable power level of communication signals of the second technology based on the power level indicator. The logic control determines a requested power level of communication signals of the second technology based on a request from a base station. The logic control provides a modified link quality representation to the base station if the requested power level is greater than the acceptable power level. The wireless device transmits to the base station with the second technology at the acceptable power level.

Another embodiment includes a wireless apparatus. The wireless apparatus includes a first modem operative to wirelessly communicate using a first wireless technology and a second modem operative to wirelessly communicate using a second wireless technology. The wireless apparatus further includes means for detecting availability of a second wireless technology. Logic control of the wireless apparatus receives a power level indicator of communication signals of the first technology. Further, the logic control is operative to determine an acceptable power level of communication signals of the second technology based on the power level indicator. The logic control is operative to determine a requested power level of communication signals of the second technology based on a request from a base station. The logic control provides a modified link quality representation to the base station if the requested power level is greater than the acceptable power level. The wireless apparatus is operative to transmit to the base station at the acceptable power level.

Another embodiment includes a method of concurrent multiple wireless technology communication. The method includes a wireless device communicating using a first technology. The wireless device establishes communication using a second technology. Logic control of the wireless device receives a power level indicator of communication signals of the first technology. The logic control determines an acceptable power level of communication signals of the second technology based on the power level indicator. The logic control determines a requested power level of communication signals of the second technology based on a request from a base station. If the requested power level is greater than the acceptable power level, then the logic control provides a modified link quality representation to the base station. The wireless device transmits to the base station with the second technology at the acceptable power level.

Other aspects and advantages of the described embodiments will become apparent from the following detailed description, taken in conjunction with the accompanying drawings, illustrating by way of example the principles of the described embodiments.

DETAILED DESCRIPTION

Methods and apparatuses for managing power consumption of a mobile device during handoff between wireless network types are disclosed. Additionally, methods and apparatuses for managing power consumption of a mobile device concurrently communicating with multiple types of wireless technologies are disclosed. The power consumption management can be focused on either maintaining power consumption of the device or maintaining the total radiated power (summed radiated power of the multiple technologies). Support of multiple wireless technologies by a single mobile device can stress the power capabilities of the wireless device. The embodiments disclosed provide for efficient use of power by controlling the power level of transmission signals during a handoff from a first wireless technology to a second wireless technology. Embodiments include controlling a transmission signal power level of signals of a second wireless technology while simultaneously transmitting signals of a first wireless technology based on a transmission signal level of the first wireless technology signals.

Figure 1:
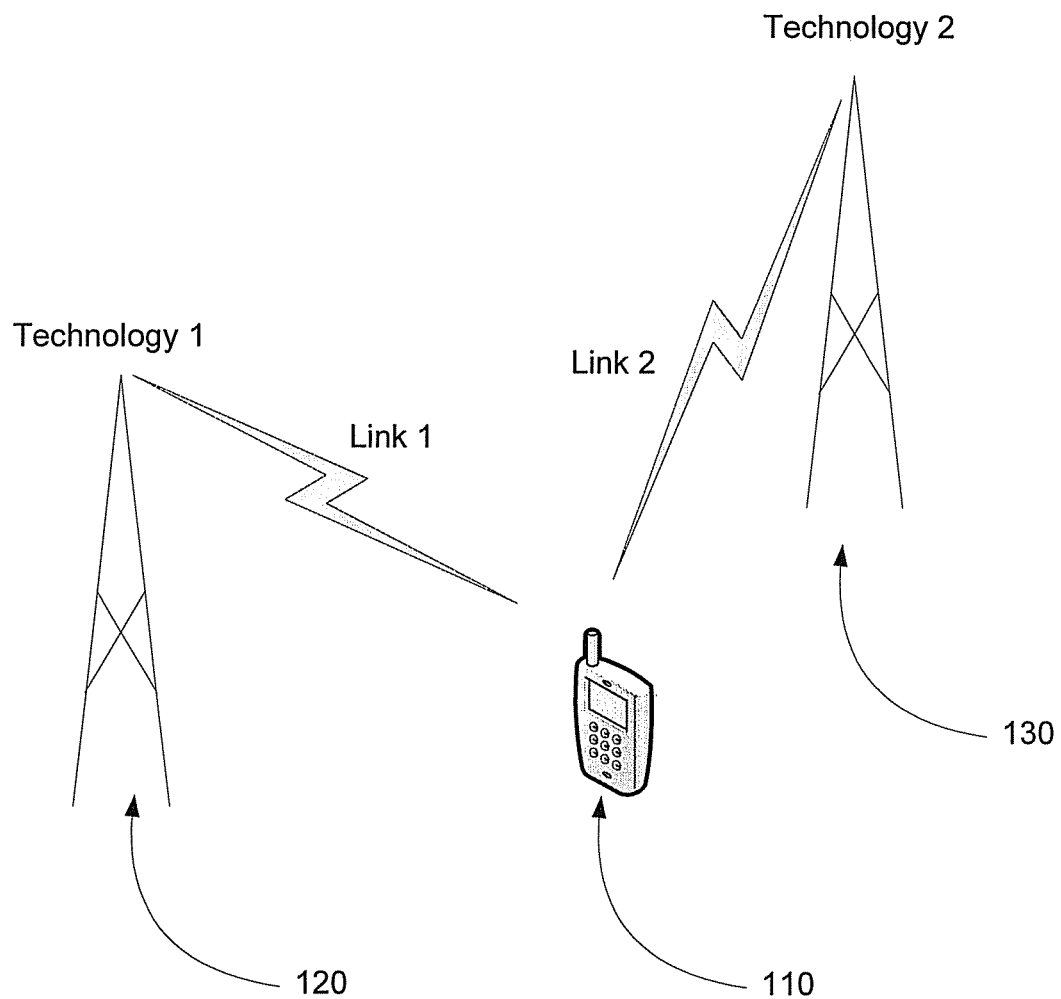
FIG. 1 shows a wireless device with wireless links to a first technology base station and a second technology base station.

FIG. 1 shows a wireless device 110 with wireless links to a first technology base station 120 and a second technology base station 130. The wireless device includes circuitry for communicating with both the first technology base station 120 and the second technology base station 130 through a first wireless link of a first wireless technology and through a second wireless link of a second wireless technology.

The power required by the wireless device to support communication over the two different technologies can be demanding. Therefore, an embodiment includes controlling transmission signal power of the second technology based on the transmission signal power of the first technology. During a handoff from the first technology base station 120 to the second technology base station 130, the transmission power of first technology signals is monitored, and the transmission power of the second technology signals is selected accordingly. Additionally, the power control of the second technology can occur during concurrent wireless communications using the first technology and the second technology.

For some embodiments, if a link quality of the second technology signal exceeds (that is, better than) a threshold, the first technology signals can be "turned off" and subsequent wireless communication utilizes the second technology. For other embodiments, one traffic type (for example, voice) can utilize one technology (e.g. CDMA2000) while the other traffic type (for example, data) can utilize another technology (e.g., LTE).

Figure 2:
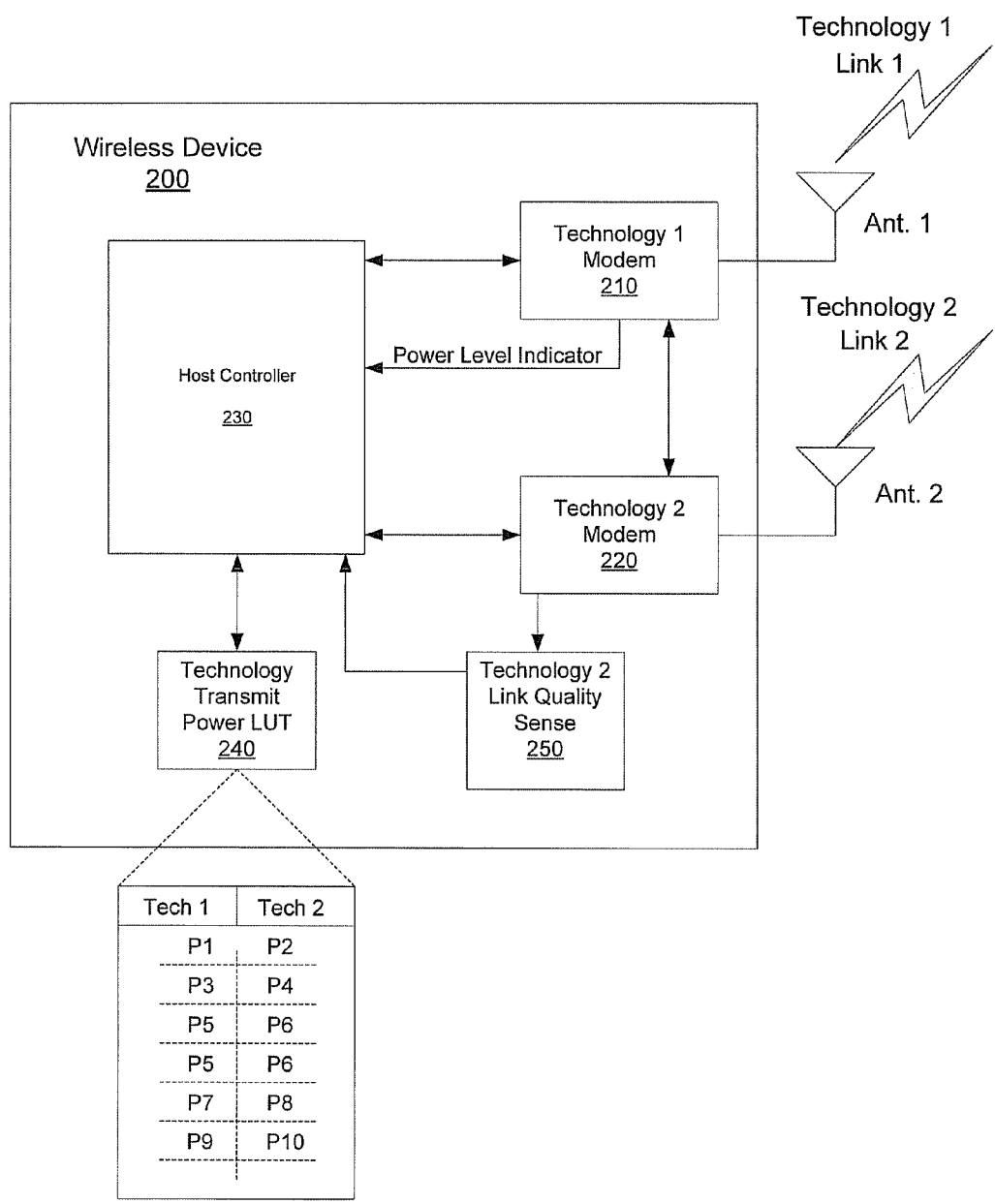
FIG. 2 shows an embodiment of a wireless device that communicates with multiple types of wireless technologies.

FIG. 2 shows an embodiment of a wireless device 200 that communicates with multiple types of wireless technologies. As shown, the wireless device 200 includes a first technology modem 210 that communicates with a first wireless technology base station through a first antenna (Ant. 1), and a second technology modem 220 that communicates with a second technology base station through a second antenna (Ant. 2). It is to be understood that each of the modems can include more than one antenna for communication. Each of the modems includes power amplifiers that amplify the transmission signals before being transmitted from the wireless device. The power amplifiers are one of the largest power consumers of the wireless device. Reducing the transmission power reduces the power consumption of the power amplifiers, which in turn, reduces the power required by the wireless device. Therefore, it is desirable to minimize the transmission power through the first technology wireless signals and/or the second technology wireless signals.

During simultaneous communications, power amplifiers for both the first technology modem 210 and the second technology modem 220 are operating. Therefore, the power consumption by the power amplifiers can be particularly large during simultaneous operation.

A controller 230 of the wireless device 200 can control (select) the transmission power of communication using the second technology based at least in part upon the transmission power level of first technology communication signals. An embodiment includes the first technology modem 210 providing a transmission power level indicator. The controller can select the transmission power of the second technology based on the received power level indicator.

For some embodiments, the transmission power level of the first technology wireless signals should be unaffected by the second technology operation. For example, voice traffic carried over first technology is higher priority than data traffic carried over second technology. Therefore, in an attempt to minimize (or at least reduce) the overall transmission power of the combined first and second technologies, the transmission power level of the second technology signals are selected based at least in part on the transmission power level (as indicated) of the first technology wireless signals.

An embodiment includes the controller selecting the transmission signal power of the second technology based on values stored within a look-up-table (LUT) 240. The controller 230 accesses a power level of the transmission signals of the second technology for the LUT 240 based on the transmission power level indicator of the first technology modem 210. That is, for example, if the first technology modem 210 provides a transmission power level indicator of P1, the LUT 240 provides the controller with the second technology transmission power level of P2.

The mobile device 200 can decide to handover to the second technology if, for example, a sensed link quality of second technology signals (per technology 2 link quality sensor 250) is above a threshold.

Figure 3:
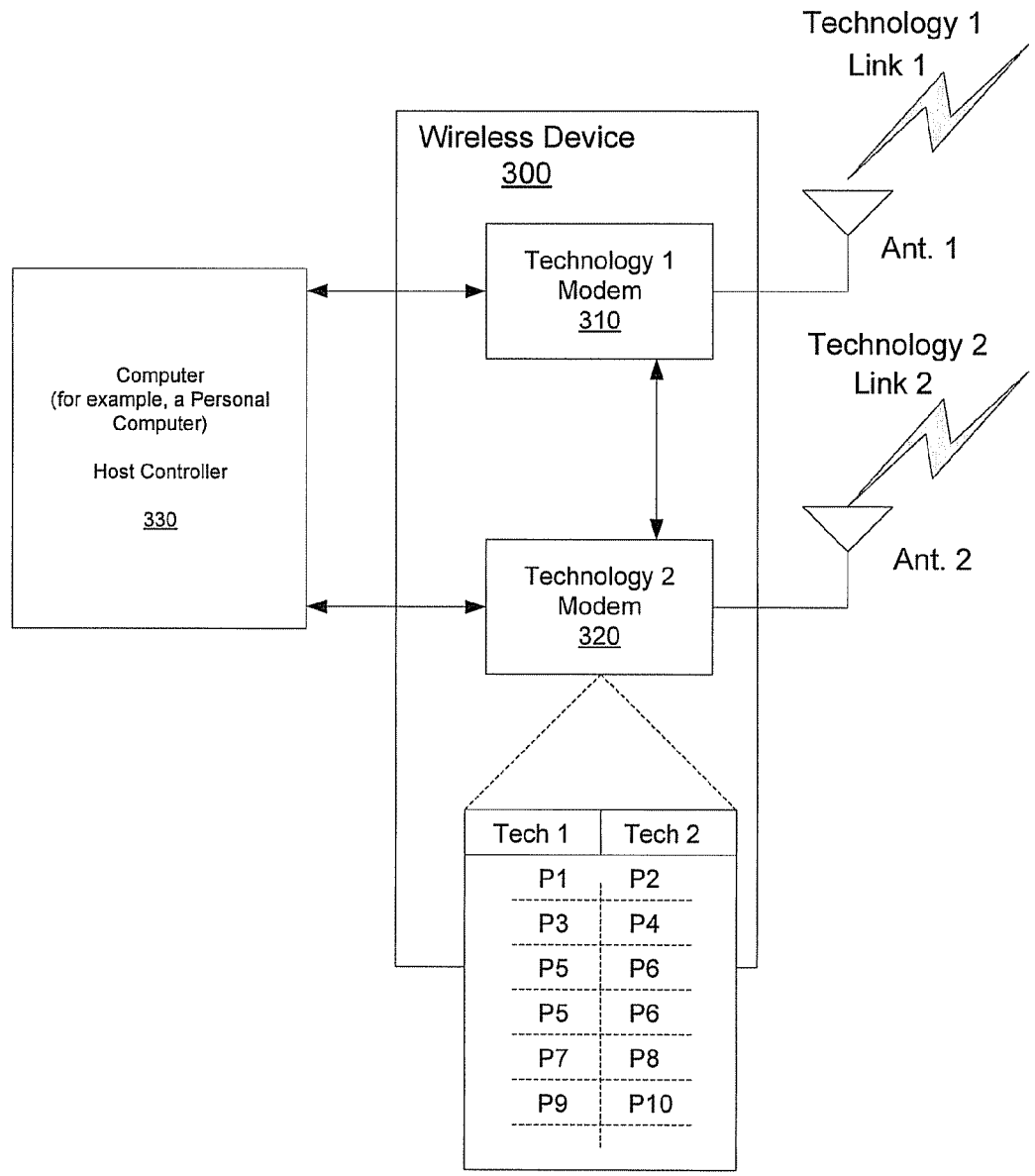
FIG. 3 shows an embodiment of a computer and a wireless device that communicate with multiple types of wireless technologies.

FIG. 3 shows an embodiment of a computer 330 and a wireless device 300 that communicate with multiple types of wireless technologies. This embodiment includes the host controller being within a computer 330, such as, a personal computer. The first technology modem 310 and the second technology modem 320 interfaces with the host controller of the computer 330, allowing concurrent wireless communication using both the first technology and the second technology. The modems 310, 320 include controllers themselves. For this embodiment, the second technology modem 320 provides control over the selection of the transmission power of the second technology modem 320. The second technology modem 320 receives the level indicator of communication signals of the first technology from the first technology modem 310.

Figure 4:
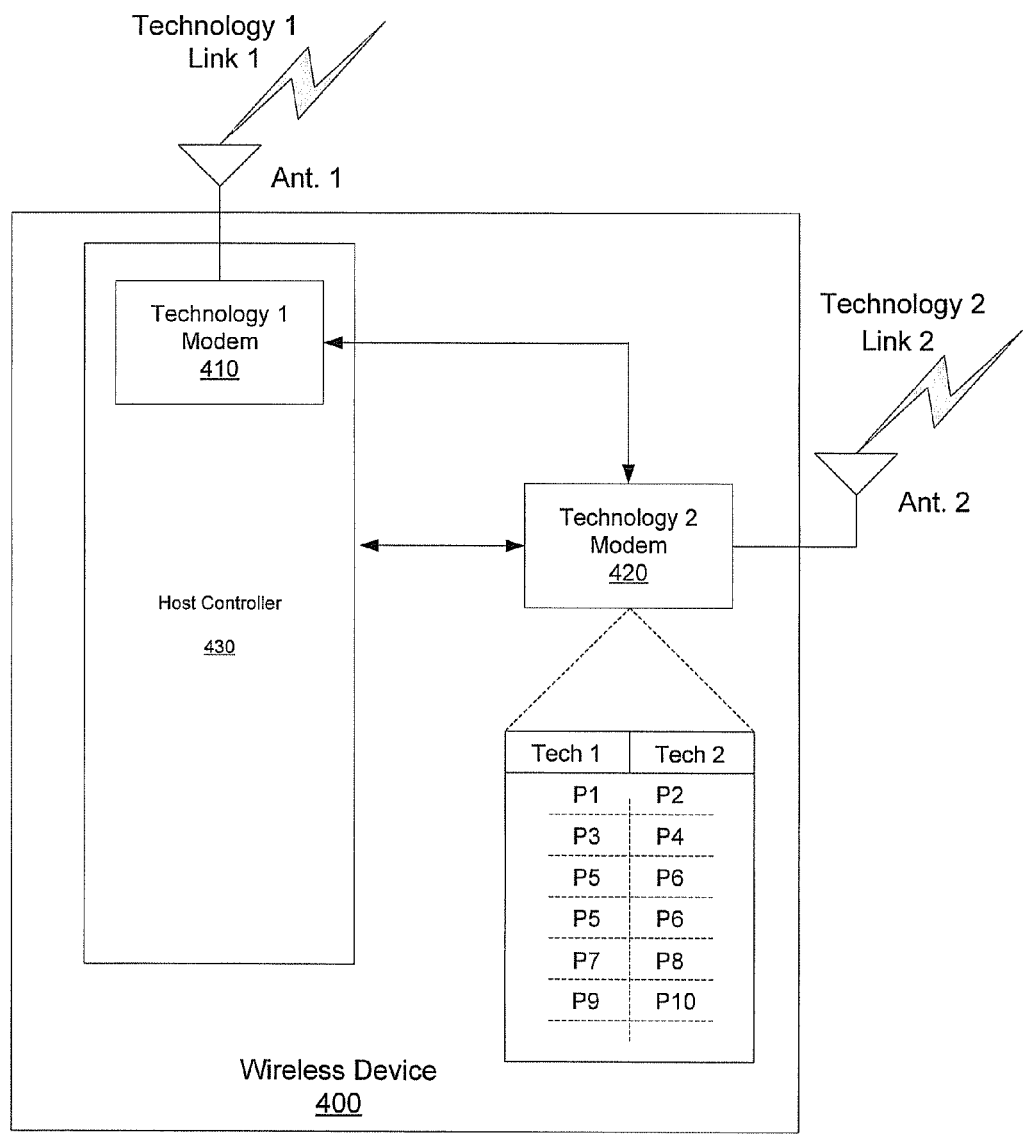
FIG. 4 shows another embodiment of a wireless device that communicates with multiple types of wireless technologies.

FIG. 4 shows another embodiment of a wireless device 400 that communicates with multiple types of wireless technologies. For this embodiment, the first technology modem 410 and the host controller 430 are combined as, for example, an existing chip set. The existing chip set (410 and 430) are interfaced with the second technology modem 420 within the wireless device 400. For this embodiment, the second technology modem 420 provides control over the selection of the transmission power of the second technology modem 420. The second technology modem 420 receives the level indicator of communication signals of the first technology from the first technology modem 410.

Figure 5:
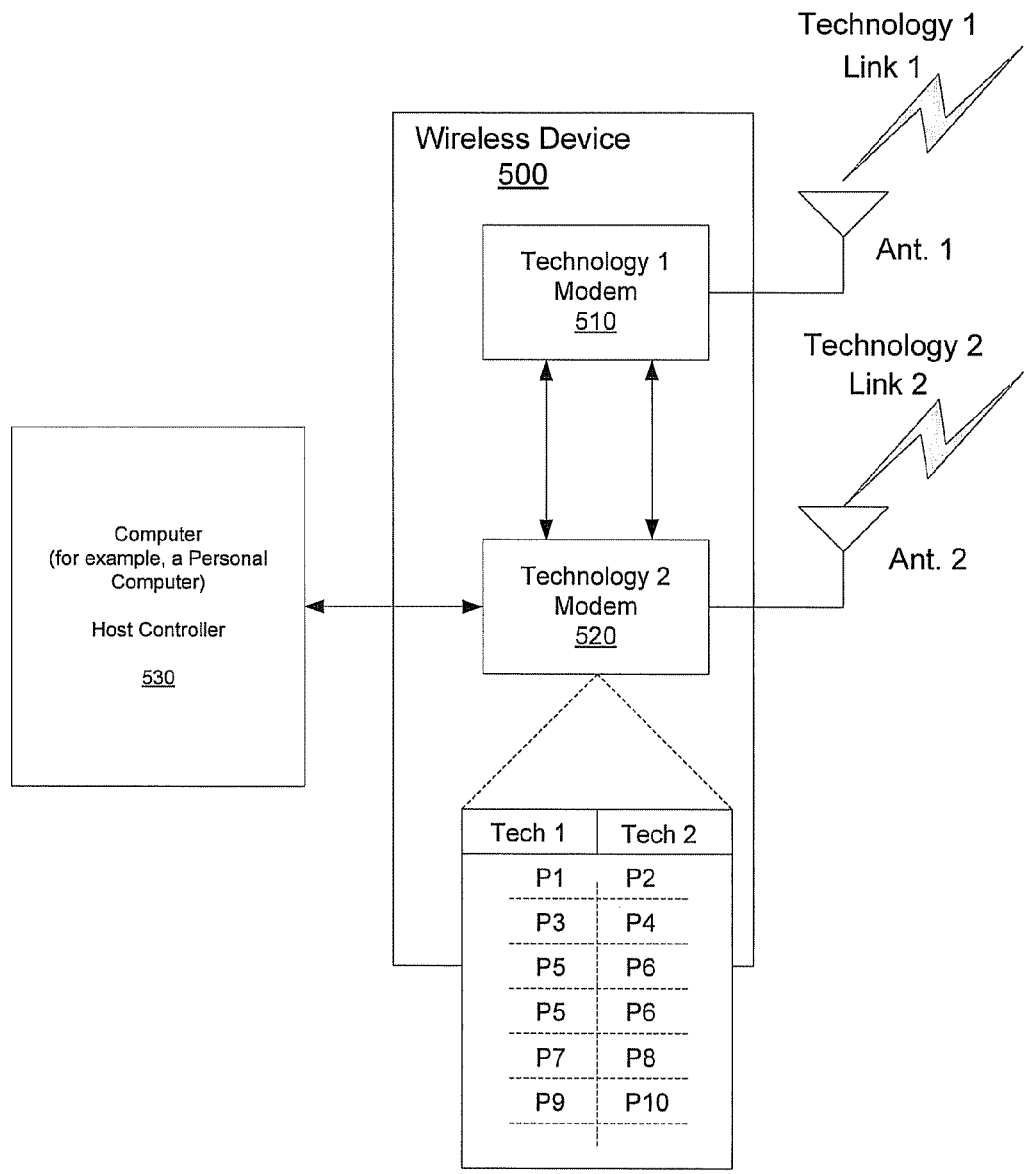
FIG. 5 shows another embodiment of a computer and a wireless device that communicate with multiple types of wireless technologies.

FIG. 5 shows another embodiment of a computer 530 and a wireless device 500 that communicate with multiple types of wireless technologies. For this embodiment, the computer 530 (that includes the host controller) interfaces with only the second technology modem 520. The first technology modem 510 interfaces with the second technology modem 520. For this embodiment, the second technology modem 520 provides control over the selection of the transmission power of the second technology modem 520. The second technology modem 520 receives the level indicator of communication signals of the first technology from the first technology modem 510.

Figure 6:
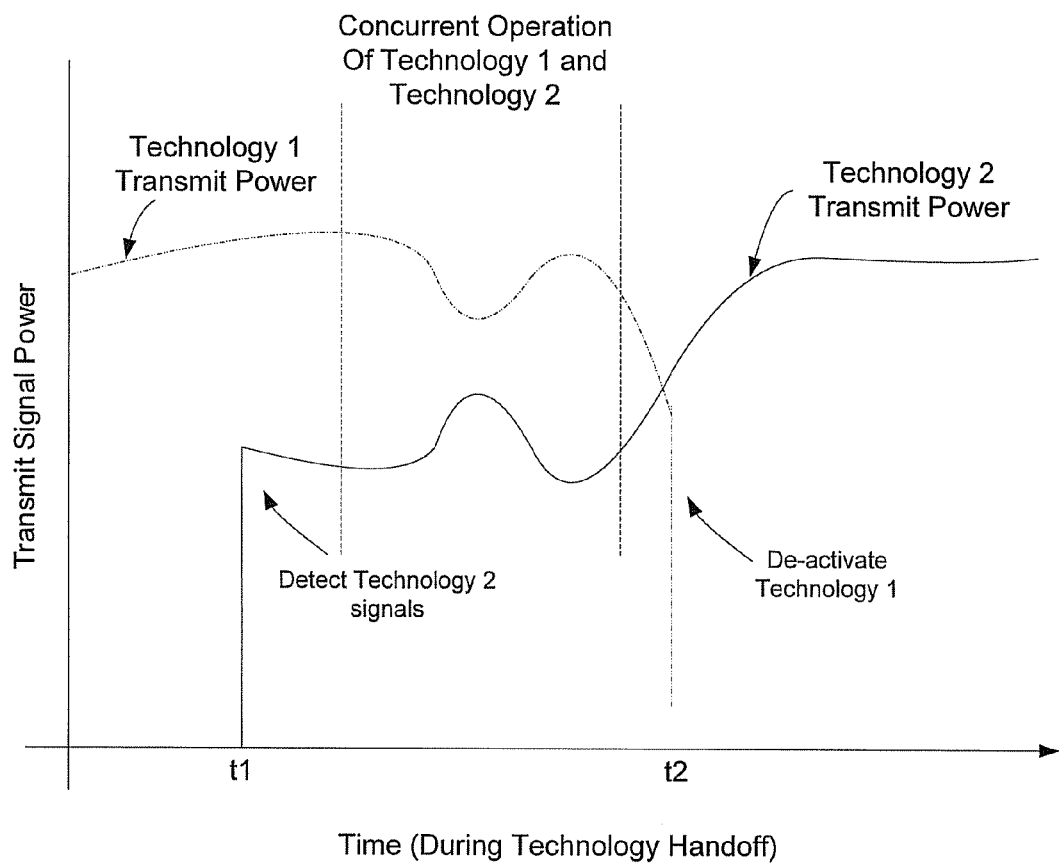
FIG. 6 is a plot of that shows an example of transmission power of a wireless device for a first wireless technology and a second wireless technology.

FIG. 6 is a plot of that shows an example of transmission power of a wireless device for a first wireless technology and a second wireless technology. The exemplary transmission powers of the plot show how the transmission power-levels of the multiple technologies can vary during a technology handoff. A first curve represents an example of the transmission power of the first technology and the second curve represents an example of the transmission power of the second technology. At a time t1 the wireless device detects the presence of a second technology base station. Based on the transmission power of the first technology, the wireless device selects the transmission power of the second technology. As can be observed, the transmission powers of the two technologies may be inversely related as the transmission power of the first technology varies, for example, based on the quality of the link of the first technology. At some point, say t2, the quality of the wireless link of the second technology may be good enough (for example, better than a threshold) and the wireless device may select to de-activate the first technology and initiate communication with the second technology. The transmission power of the second technology may then vary according to the quality of the link of the second technology. What can be observed is that the transmission power of the second technology is selected based on the transmission power of the first technology. For some embodiments, the wireless device has essentially no control over the transmission power of the first technology, and must select the transmission power of the second technology accordingly.

While FIG. 6 shows detection of technology 2 and de-activation of technology 1, other embodiments include the power control between the two technologies in a concurrent operational use case (e.g. voice and data).

Figure 7:
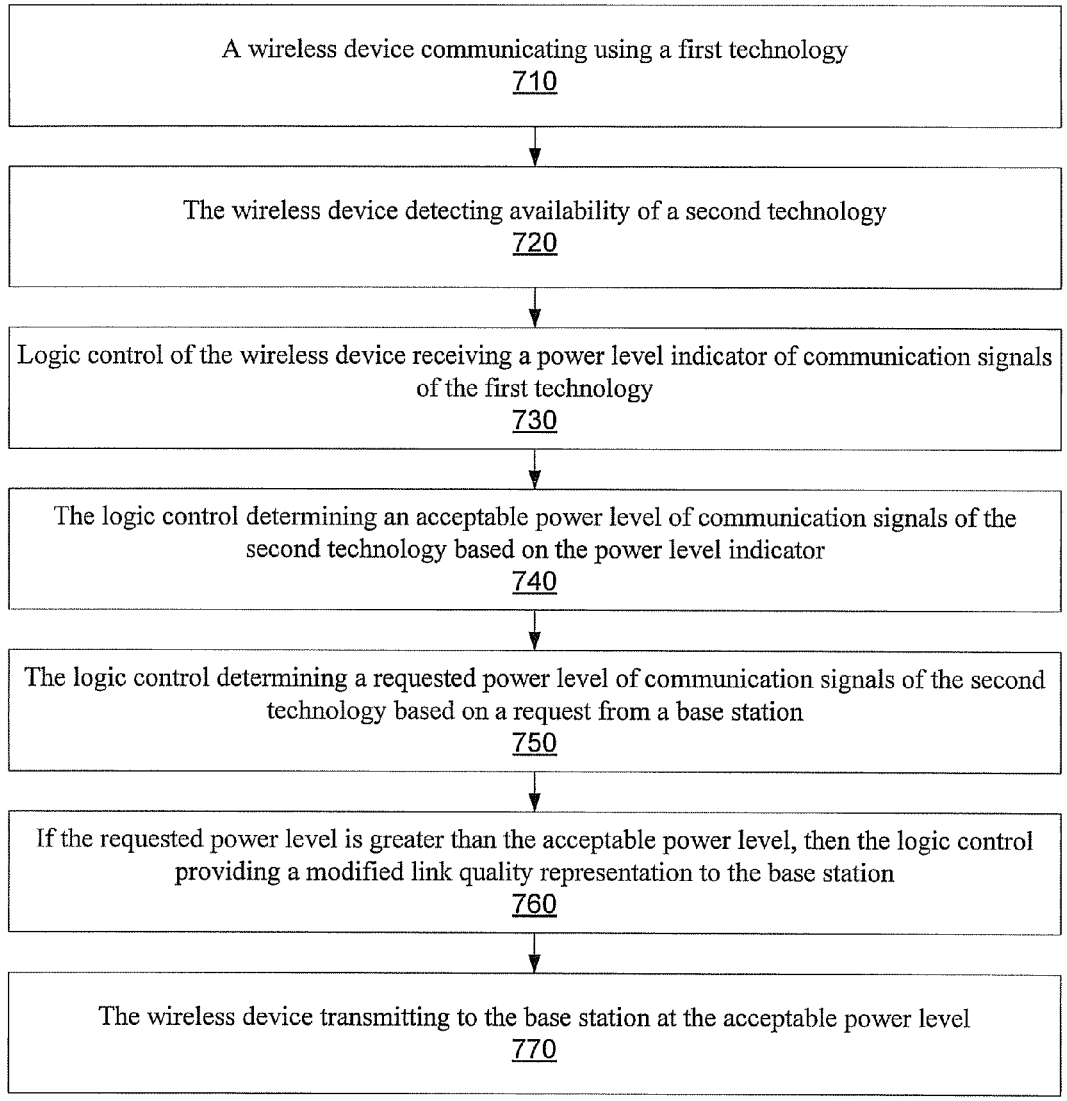
FIG. 7 is a flow chart that includes steps of an example of a method of wireless technology handoff.

FIG. 7 is a flow chart that includes steps of an example of a method of wireless technology handoff. A first step 710 includes a wireless device communicating using a first technology. A second step 720 includes the wireless device detecting availability of a second technology. A third step 730 includes logic control of the wireless device receiving a power level indicator of communication signals of the first technology. A fourth step 740 includes the logic control determining an acceptable power level of communication signals of the second technology based on the power level indicator. A fifth step 750 includes the logic control determining a requested power level of communication signals of the second technology based on a request from a base station. A sixth step 760 includes the logic control providing a modified link quality representation to the base station if the requested power level is greater than the acceptable power level. A seventh step 770 includes the wireless device transmitting to the base station with the second technology at the acceptable power level.

For an embodiment, the logic control determines an acceptable power level of communication signals of the second technology by referencing a LUT to determine an acceptable power level of communication signals of the second technology based on the power level indicator. For another embodiment, the logic control determining an acceptable power level of communication signals of the second technology includes the logic control adaptively calculating an acceptable power level of communication signals of the second technology based on the power level indicator. For example, the physical orientation of the mobile device determines the antenna radiation pattern of each technology and hence the effective radiated power from the multiple radios. The host controller can determine the orientation of the device and adaptively adjust the acceptable power level. Similarly, the battery level (e.g. through reading the voltage) can be used by the host controller to adaptively adjust the acceptable power level.

Wireless communication base stations can select modulation formats (order of modulation) and coding base at least in part upon estimates of the quality of the wireless link between the base station and the mobile wireless device the base station is in communication with. In some situations, the base station receives information from the mobile wireless device that provides the base station with quality information of the wireless link. As described, the wireless device provides the base station with a modified link quality representation. Embodiments include the base station selecting an MCS (modulation and coding scheme) for the wireless device based on the modified link quality representation.

For an embodiment, the base station selects a sub-channel allocation for the wireless device based on the modified link quality representation. For example, it would allocate fewer sub-channels to the mobile than it would have based on the mobile maximum possible transmit power.

For an embodiment, providing a modified link quality representation to the base station includes providing a modified head room indication to the base station. The head room can generally be defined as an indication of how much additional transmission power can be used by the wireless device. Namely, the head room represents a power offset between a most capable transmitting power of the wireless and a current transmitting power of the wireless device. This can be also defined as the difference between a nominal maximum transmit power and an estimated power transmission.

The logic control can be included within a controller of the wireless device. Additionally, or alternatively, the logic control can reside within a modem of the first technology or a modem of the second technology. For a specific embodiment, the logic control is not located within a host controller of the wireless device. For an embodiment, the power level of first technology is communicated directly to the second technology modem from the first technology modem through inter-modem communication without the host controller involvement.

The requested power level comes from the base station. For an embodiment, the wireless device determines whether to communicate through the second technology based on a value of the requested power level. For another embodiment, the wireless device determines whether to communicate through the second technology based on a value of the requested power level, and an estimated quality of a second technology wireless link.

The estimated quality of the second wireless link can be determined by, for example, measuring a signal quality of pilot tones of received second wireless technology signals.

For an embodiment, the wireless device ceases communication with the first technology when successful communication with the second technology has been established. Successful communication is generally achieved when a signal quality of received signal technology signals are better than a threshold.

For an embodiment, detecting availability of the second technology includes an autonomous low power scanning mode which requires no intervention from the host controller or the first technology modem. For example, the second technology modem is in a deep PMU (Power Management Unit) based power saving mode with a RTC (Real Time Clock) running and marking intervals for wake-up. Upon wake-up, the second technology modem performs a low power scan (for example, using a reduced receiver antenna set, reduced ADC sampling rate, etc.) to search for the base station frequencies and ID-s stored in its memory without requiring assistance from the host controller or the first technology modem. Such an autonomous low power scan mode is important to save the overall battery power of the wireless device since the host controller and the first technology modem can remain in a low power state when the second technology is in autonomous low power scan mode.

For an embodiment, detecting availability of the second technology can occur with the host controller or the first technology modem triggering the detection based on location of the mobile device (for example, using GPS co-ordinates) and/or the location identifier of the first technology (for example, Cell ID of the first technology).

For an embodiment, the user application session (for example, video streaming) experiences a seamless handover through a virtual network interface that exposes with the applications. The virtual network interface masks the interface up, and interface down events from the individual technology network adapters, and buffers the packets during handover.

Figure 8:
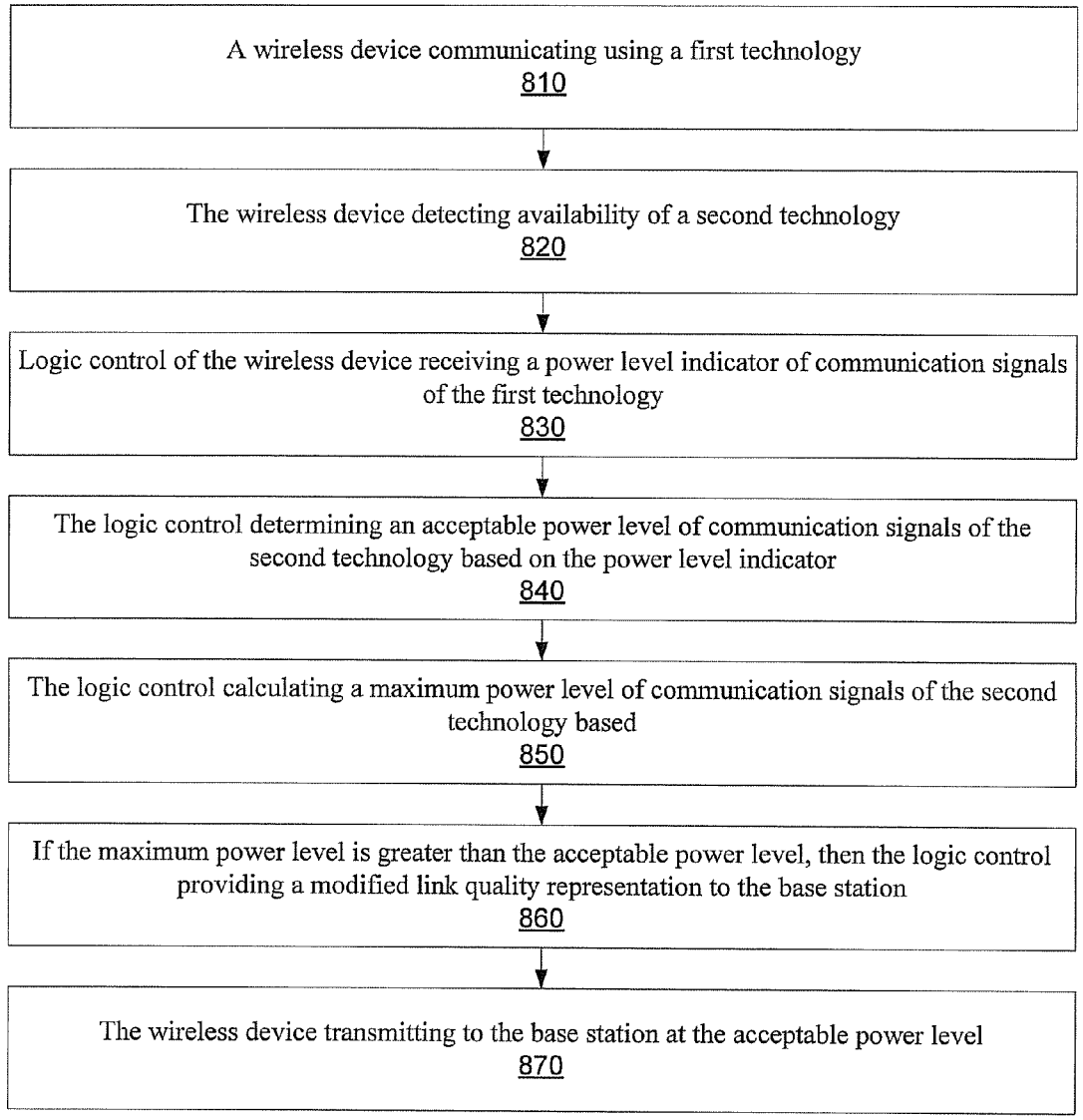
FIG. 8 is a flow chart that includes steps of another example of a method of wireless technology handoff.

FIG. 8 is a flow chart that includes steps of another example of a method of wireless technology handoff. A first step 810 includes a wireless device communicating using a first technology. A second step 820 includes the wireless device detecting availability of a second technology. A third step 830 includes logic control of the wireless device receiving a power level indicator of communication signals the first technology. A fourth step 840 includes the logic control determining an acceptable power level of communication signals of the second technology based on the power level indicator. A fifth step 850 includes the logic control calculating a maximum power level of communication signals of the second technology based on factors such as (i) the antenna characteristics of the first technology modem, (ii) the antenna characteristics of the second technology modem, (iii) the hardware power supply interface of the second technology modem (for example, USB bus powered or Battery powered), (iv) power amplifier efficiency, (v) second technology baseband and radio circuit power draw, (vi) first technology baseband and radio circuit power draw, and (vii) host controller power draw. A sixth step 860 includes the logic control providing a modified link quality (head room) representation to the base station if the maximum power level is greater than the acceptable power level. A seventh step 870 includes the wireless device transmitting to the base station at the acceptable power level.

Figure 9:
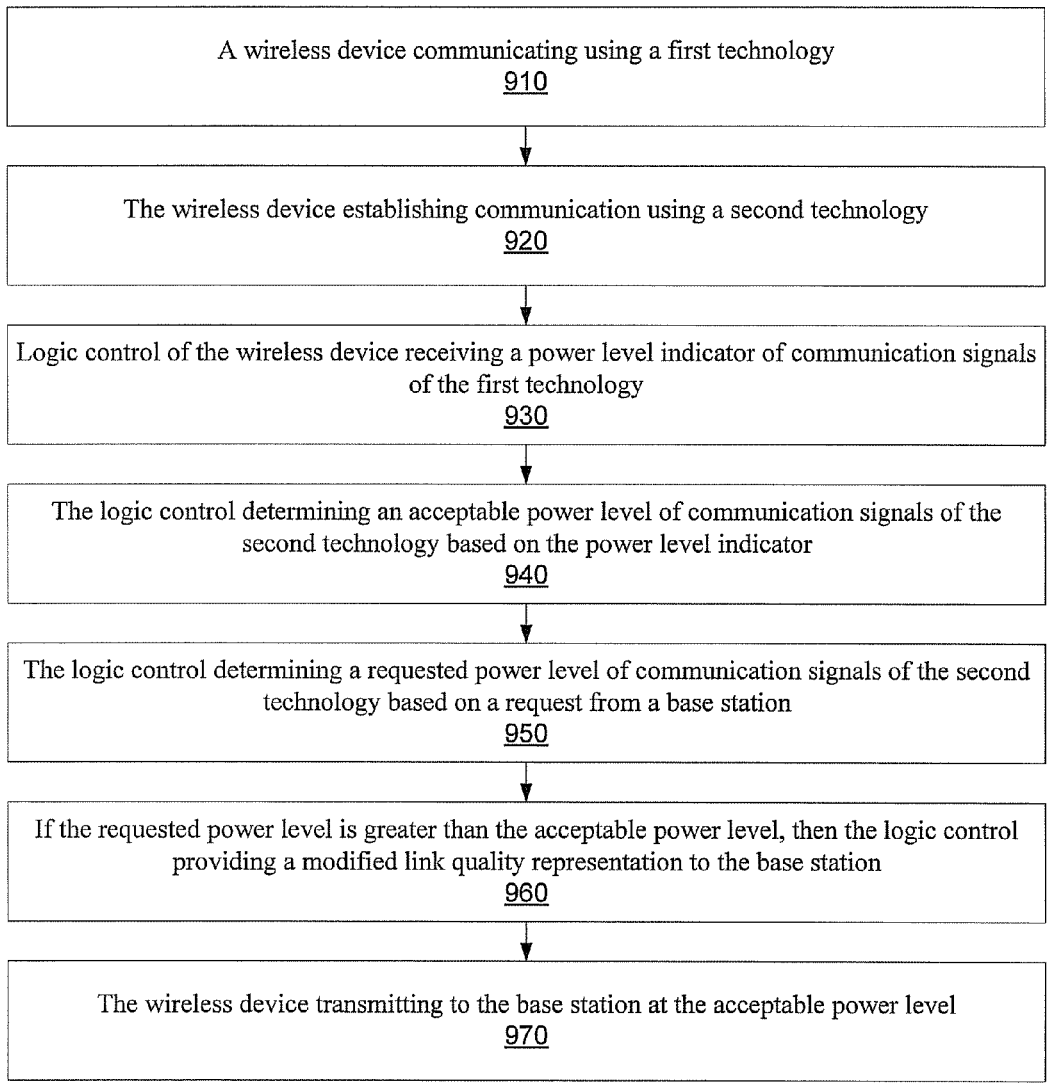
FIG. 9 is a flow chart that includes steps of a method of concurrent multiple wireless technology communication.

FIG. 9 is a flow chart that includes steps of a method of concurrent multiple wireless technology communication. A first step 910 includes a wireless device communicating using a first technology. A second step 920 includes the wireless device establishing communication using a second technology. A third step 930 includes logic control of the wireless device receiving a power level indicator of communication signals of the first technology. A fourth step 940 includes the logic control determining an acceptable power level of communication signals of the second technology based on the power level indicator. A fifth step 950 includes the logic control determining a requested power level of communication signals of the second technology based on a request from a base station. A sixth step 960 includes if the requested power level is greater than the acceptable power level, then the logic control providing a modified link quality representation to the base station. A seventh step 970 includes the wireless device transmitting to the base station at the acceptable power level.

An embodiment includes a method of wireless technology handoff wherein only one of the technology modems is transmitting at any given time. The method includes a wireless device communicating using a second technology and detecting that the second technology is going out of coverage area and sending a direct hardware or software signal to the first technology modem triggering that a handoff is anticipated. Upon receiving the trigger, the first technology modem resumes from a low power state and scans for the first technology signals (for connectivity). Upon detecting an appropriate first technology signal and prior to attempting registration, the first technology modem sends a direct hardware or software signal to the second technology modem that it has been successful in finding the first technology signals and the second technology modem then enters an autonomous low power scanning state.

Through the usage of direct modem-to-modem handoff signaling several performance improvements and implementation benefits are achieved. For example, the handoff latency is reduced since the handoff signaling is directly between the modems through hardware/software signaling without using the host controller. Moreover, the handoff can be performed even when the host controller is in a low power state and thereby reducing the overall system power consumption. Additionally, since the handoff signaling is implemented between the modems and not through host controller, portability of the handoff solution implementation to different host controllers is made easy.

Transitions between communication protocols may be enabled via direct communication between modules for two different technologies. Devices that may use two technologies include: Dual-Mode USB Dongles; Dual-Mode Express Cards; Mobile Routers; and Smart Phones. The first technology may be, for example, a 4G mobile communication protocol. The second technology may be, for example, a 3G mobile communication protocol. Fast transitions between 3G and 4G may use Inter-Chip Handover Control. These transitions may be controlled via direct communication between 3G and 4G chipsets, thereby allowing for dual-mode radio management to be embedded within a device. Direct communication between 3G and 4G chipsets may also reduce the handover latency and move radio management logic into a device.

Figure 10:
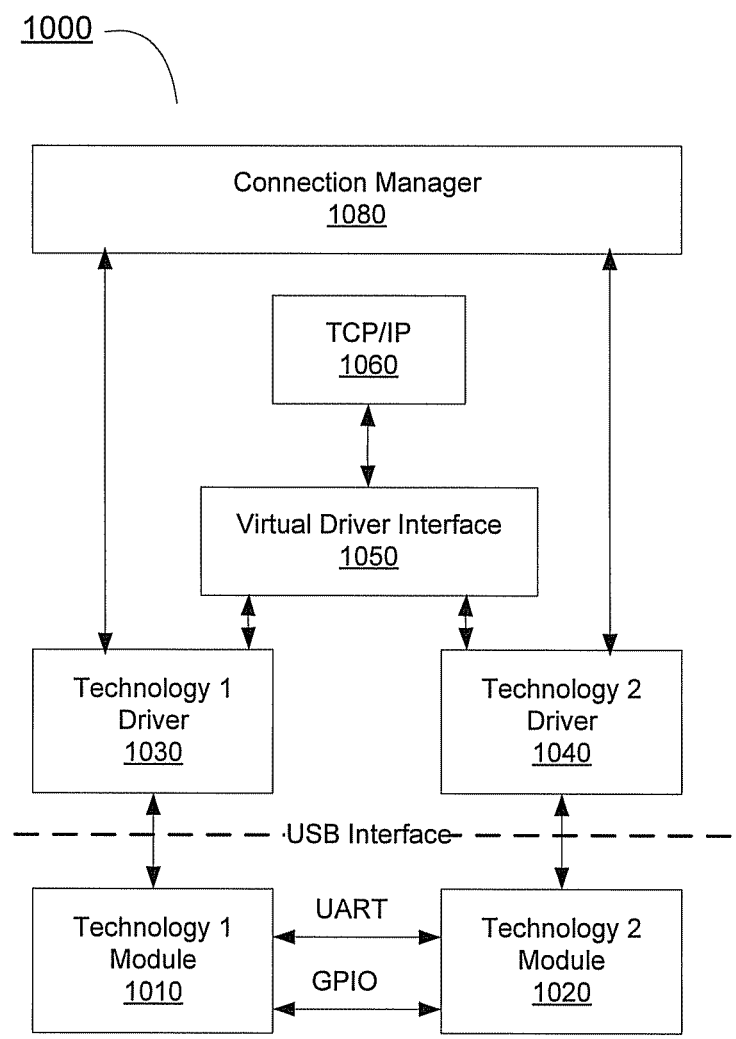
FIG. 10 shows another embodiment of a computer and a wireless device that communicate with multiple types of wireless technologies.

FIG. 10 shows an embodiment of a device 1000 having a module of a first technology 1010 and a module of a second technology 1020 for communicating with multiple types of wireless technologies. This embodiment includes a virtual driver interface 1050 and a connection manager 1080, which may be implemented in a computer or a microprocessor.

The first technology module 1010 and the second technology module 1020 communicate with the virtual driver interface 1050 via a first technology driver 1030 and the second technology driver 1040. Communication between the first technology module 1010 and the first technology driver 1030 may be across a USB interface. Likewise, communication between the second technology module 1020 and the second technology driver 1040 may also be across the USB interface. The handover process from 4G-to-3G and vice-versa involves a certain break time at the IP level. Although the IP address acquired on both the networks may be the same due to Proxy-MIP/Client-MIP implementations, the break time and interface change during the 4G-to-3G transition can cause the application sessions to break when handover occurs. The virtual driver interface 1050 masks these network interface changes by exposing a composite network interface (for example, a filter driver implementation). It may also ensure that the packet loss during the handover period is minimal by sufficiently buffering/draining packets from one interface to another. Applications, such as IE and VPN, which run over TCP/IP 1060 may seamlessly move between technologies without noticeable interruption.

Communication between the first technology module 1010 and the second technology module 1020 may be enabled using a UART interface and a GPIO interface. Control for 4G-to-3G transition may be indicated by GPIO2 and GPIO14 on the GPIO interface. Going out of 4G coverage may be triggered via GPIO2 indication sent by the first technology module 1010. When GPIO2 is asserted high from the first technology module 1010, the second technology module 1020 may exit Low Power mode and start scanning. The first technology module 1010 may enter shutdown mode via GPIO14 indication sent by the second technology module 1020. When 3G side synchronization is achieved, the second technology module 1020 may assert GPIO14 high. The 3G firmware may assert this GPIO high when it achieves PRL lock, after it completes synchronizations state and before it enters idle state or attempts registration. The GPIO should ideally be held 300 ms before the PA is turned ON. The sequence of steps is: 1) 3G completes synchronization (time $T_0$); 2) GPIO asserted high (time $T_1$); and 3) 3G starts idle/registration and PA will be turned ON (time $T_3$). From a timing perspective, $T_3$-$T_1$ may be 300 ms or more, thereby the first technology module 1010 may enter lowest power state across different host operating systems.

A user may access a new technology when the new technology is available, and the user may fall back to an older technology when the new technology is not available. A connection manager 1080 is a higher-level entity that may be used by dual-mode devices to switch from one technology to another. The connection manager 1080 may be embedded within the device hardware/firmware using Inter-Chip Handover Control. Inter-Chip Handover Control embeds the logic for 3G/4G radio management within the device. The Connection Manager 1080 may be capable of turning off the going out of 4G coverage trigger in firmware by disabling the feature. The Connection Manager 1080 may be capable of conducting 4G-to-3G and 3G-to-4G handovers according to purely CM (connection manager) dependent logic (that is, bypassing the Inter-Chip Handover control) that communicates with the first technology driver 1030 and the second technology driver 1040. This capability would be required, for example during an initial device launch where the firmware changes on 3G side may not be ready and the operator would want to launch the device with CM-based handover logic first and then upgrade to the Inter-Chip Handover Control in a maintenance release.

The Connection Manager 1080 may be capable of handling 3G-to-4G transitioning even when Inter-Chip Handover is enabled. This can be done by performing background scanning of 4G while 3G is in dormant mode. Background scanning can be done using a Low Power Scan mode. Connection Manager 1080 may also handling 4G authentication. The virtual driver 1050 can either be embedded into the Connection Manager 1080 or exist as a separate software.

Figure 11:
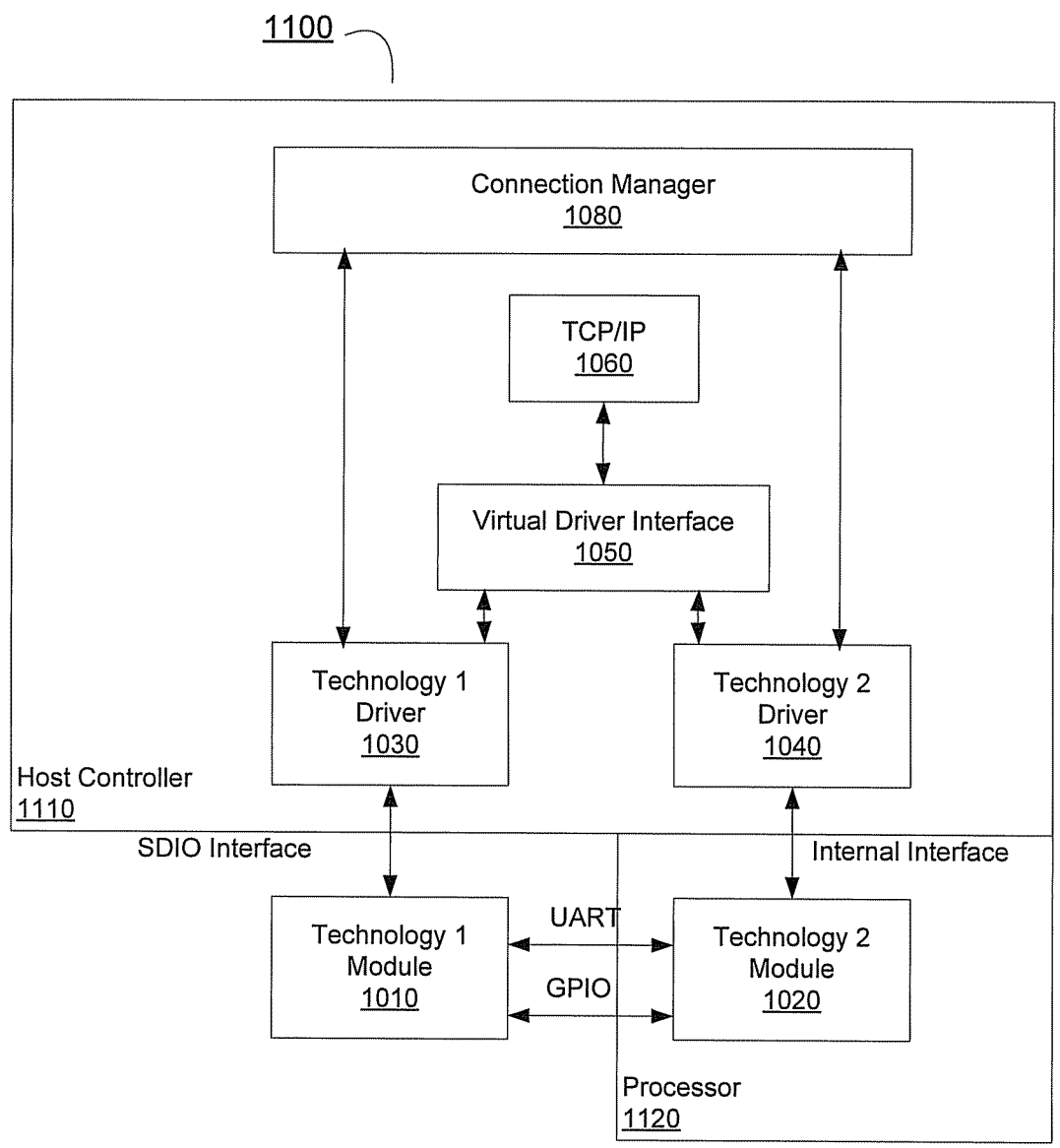
FIG. 11 shows another embodiment of a wireless device that communicates with multiple types of wireless technologies.

FIG. 11 shows an embodiment of a device 1100 having the first technology module 1010; the second technology module 1020; the first technology drive 1030; the second technology driver 1040; the virtual driver interface 1050; the TCP/IP connection 1060 and the connection manager 1080, as in FIG. 10.

For this embodiment 1100, the second technology modem 1020 may be implemented in a processor 1120 and may be combined with a host controller 1110 as a chip set. The chip set (1110 and 1120) may interface with the first technology modem 1010 within a device. Communication between the first technology module 1010 and the first technology driver 1030 may be across an SDIO interface. Communication between the second technology module 1020 and the second technology driver 1040 may be across an internal interface.

Figure 12:
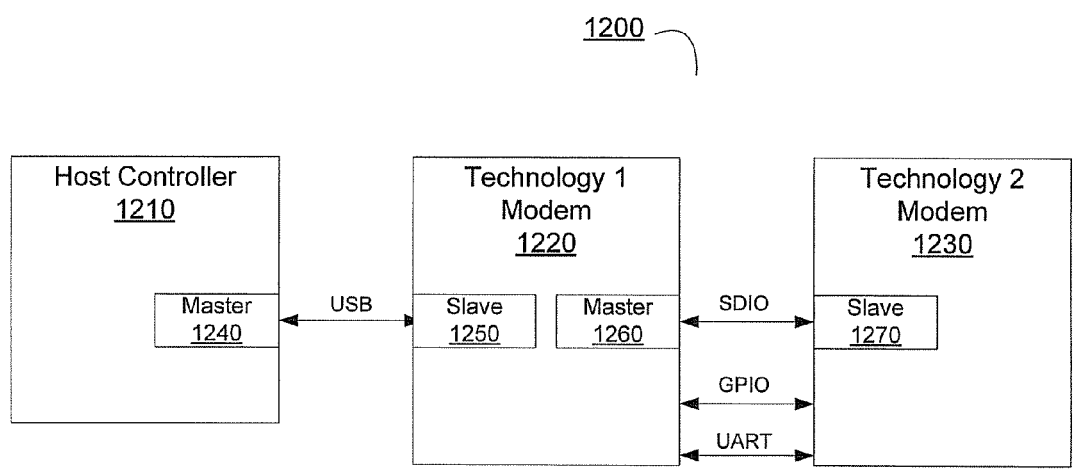
FIG. 12 shows another embodiment of a computer and a wireless device that communicate with multiple types of wireless technologies.

FIG. 12 shows another embodiment of a host controller 1210; a first technology modem 1220 and a second technology modem 1230. The host controller 1210 is a master over the first technology modem 1220. The host controller 1210 comprises a master interface 1240 that communicates via a USB connection with a slave interface 1250 on the first technology modem 1220. The first technology modem 1220 interfaces with the second technology modem 1230. The first technology modem 1220 host controller 1210 is a master over the second technology modem 1230. The first technology modem 1220 comprises a master interface 1260 that communicates via an SDIO connection with a slave interface 1270 on the second technology modem 1270. The first technology modem 1220 provides control over the selection of the transmission power of the first technology modem 1220. The first technology modem 1220 receives the level indicator of communication signals of the second technology from the second technology modem 1230.

Although specific embodiments of the invention have been described and illustrated, the invention is not to be limited to the specific forms or arrangements of parts so described and illustrated. The invention is limited only by the appended claims.

What is claimed:

1. A device configured to communicate using a first technology and a second technology, comprising:
   a first modem configured to communicate using the first technology;
   a second modem configured to communicate using the second technology; and
   a connection manager configured to:
   select, based on a power level associated with the first technology, an acceptable power level associated with the second technology that controls an overall transmission power associated with the combined first and second technologies; and
   control a handover from the first technology to the second technology.

2. The device of claim 1, wherein the first technology and the second technology are wireless communication technologies.

3. The device of claim 1, further comprising a virtual driver, communicatively coupled to the first modem and the second modem, configured to provide a composite network interface during the handover.

4. The device of claim 3, wherein the virtual driver is further configured to reduce packet loss during the handover by buffering packets associated with the first technology.

5. The device of claim 3, wherein the virtual driver is further configured to reduce packet loss during the handover by draining packets associated with the first technology.

6. The device of claim 1, wherein the connection manager is further configured to select the acceptable power level associated with the second technology based on a power level indicator associated with the first technology and at least one of a physical orientation of the device and a battery level of the device.

7. The device of claim 3, wherein the virtual driver is embedded in the connection manager.

8. The device of claim 1, wherein the connection manager is further configured to provide a modified link quality representation to a base station if a requested power level, received from the base station, is greater than the acceptable power level associated with the second technology.

9. The device of claim 1, wherein the connection manager is further configured to control the handover based on a requested power level, received from a base station, and an estimated link quality associated with the second technology.

10. The device of claim 1, wherein the acceptable power level associated with the second technology is selected so as to minimize the overall transmission power associated with the combined first and second technologies.

11. A device configured to communicate using a first technology and a second technology, comprising:
    a host controller configured to:
    select based on a power level associated with the first technology, an acceptable power level associated with the second technology that controls an overall transmission power associated with the combined first and second technologies; and
    control a handover from the second technology to the first technology;
    a first modem configured to communicate using the first technology and to be a slave to the host controller; and
    a second modem configured to communicate using the second technology and to be a slave to the first modem.

12. The device of claim 11, wherein the first technology and the second technology are wireless communication technologies.

13. The device of claim 11, further comprising a virtual driver, communicatively coupled to the first modem and the second modem, configured to provide a composite network interface during the handover.

14. The device of claim 11, wherein the acceptable power level associated with the second technology is selected so as to minimize the overall transmission power associated with the combined first and second technologies.

15. The device of claim 13, wherein the virtual driver is embedded in the host controller.

16. The device of claim 11, wherein the host controller is further configured to
    provide a modified link quality representation to a base station if a requested power level, received from the base station, is greater than the acceptable power level.

17. The device of claim 11, wherein the host controller is further configured to control the handover based on a requested power level received from a base station and an estimated link quality associated with the second technology.

18. A method for communicating with a device, using a first technology and a second technology, comprising:
    selecting, based on rower level associated with the first technology, an acceptable power level associated with the second technology that controls an overall transmission power associated, with the combined first and second technologies, and
    controlling a handover from the first technology to the second technology.

19. The method of claim 18, wherein the acceptable power level associated with the second technology is selected so as to minimize the overall transmission power associated with the combined first and second technologies.

20. The method of claim 18, wherein the first technology and the second technology are wireless communication technologies.

21. The method of claim 18, further comprising
    buffering packets from the first technology to reduce packet loss during the handover.

22. The method of claim 18, further comprising
    draining packets from the first technology to reduce packet loss during the handover.

23. The method of claim 18, farther comprising providing a modified link quality representation to a base station if a requested power level received from the base station is greater than the acceptable power level associated with the second technology.

24. The method of claim 18, wherein the selecting comprises selecting the acceptable power level associated with the second technology based on the power level associated with the first technology and an estimated link quality associated with the second technology.

* * * * *

UNITED STATES PATENT AND TRADEMARK OFFICE
CERTIFICATE OF CORRECTION

PATENT NO. : 8,687,594 B2  
APPLICATION NO. : 13/033058  
DATED : April 1, 2014  
INVENTOR(S) : Kameswara Medapalli Page 1 of 1

It is certified that error appears in the above-identified patent and that said Letters Patent is hereby corrected as shown below:

In the Claims:

Column 11, line 18 please delete "indicator" between --power level-- and --associated--.

Column 11, line 39 insert --,-- between --select-- and --based--.

Column 12, line 22 please replace "rower" with --a power--.

Column 12, line 25 please delete "," between --associated-- and --with--.

Column 12, line 42 please replace "farther" with --further--.

Signed and Sealed this  
Eighth Day of July, 2014

Michelle K. Lee  
*Deputy Director of the United States Patent and Trademark Office*